United States Patent [19]
Johnson

[11] Patent Number: 5,219,268
[45] Date of Patent: Jun. 15, 1993

[54] GAS TURBINE ENGINE CASE THERMAL CONTROL FLANGE

[75] Inventor: David M. Johnson, Mainville, Ohio

[73] Assignee: General Electric Company, Cincinnati, Ohio

[21] Appl. No.: 847,394

[22] Filed: Mar. 6, 1992

[51] Int. Cl.⁵ .................... F01D 25/14; F01D 11/00
[52] U.S. Cl. ................................... 415/115; 415/175
[58] Field of Search ............... 415/115, 116, 173.1, 415/175

[56] References Cited

U.S. PATENT DOCUMENTS

| | | | |
|---|---|---|---|
| 3,391,904 | 7/1968 | Albert et al. | 415/116 |
| 4,222,707 | 9/1980 | Drouet et al. | 415/116 |
| 4,363,599 | 12/1982 | Cline et al. | 415/136 |
| 4,551,064 | 11/1985 | Pask | 415/115 |
| 4,696,619 | 9/1987 | Lardellier | 415/138 |
| 4,730,832 | 3/1988 | Cederwall et al. | 415/116 |
| 4,826,397 | 5/1989 | Shook et al. | 415/116 |
| 4,841,726 | 6/1989 | Burkhardt | 415/116 |
| 4,859,142 | 8/1989 | Burke et al. | 415/116 |
| 5,100,291 | 3/1992 | Glover | 415/115 |

Primary Examiner—Edward K. Look
Assistant Examiner—Michael S. Lee
Attorney, Agent, or Firm—Jerome C. Squillaro; John R. Rafter

[57] ABSTRACT

An apparatus is provided to thermally control a section of engine casing by flowing heat transfer fluid within an axially disposed set of circular flowpaths within a section of engine casing or flange such as a thermal control ring. Flowpaths are preferably arranged in alternating counterflowing directions in the ring such that there is substantially no circumferential gradient in the mass flowrate weighted average temperature of the heat transfer fluid supplied by any two adjacent counterflowing fluid flowpaths. Each flowpath may have two or more circuits having inlets and outlets for flowing the heat transfer fluid.

18 Claims, 7 Drawing Sheets

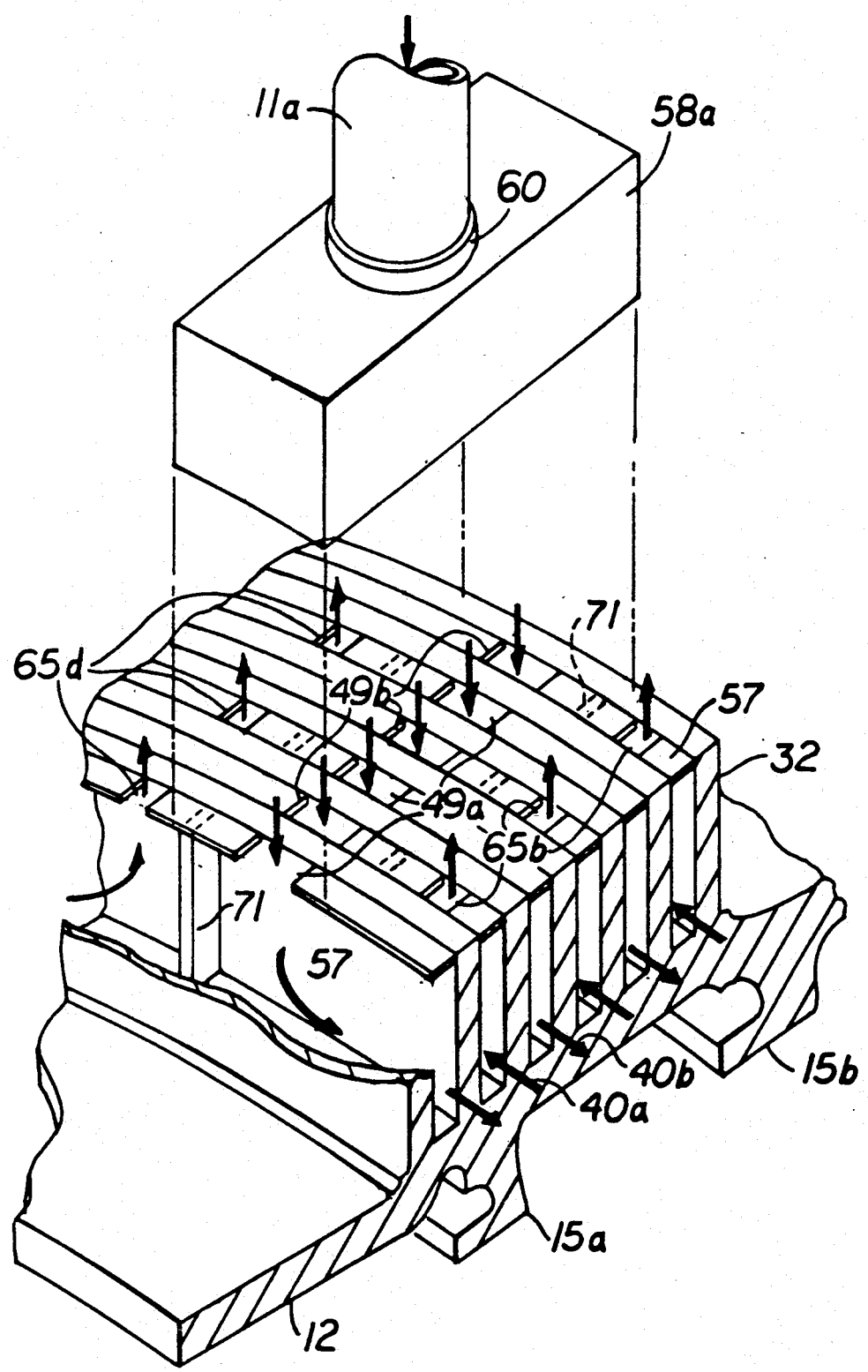

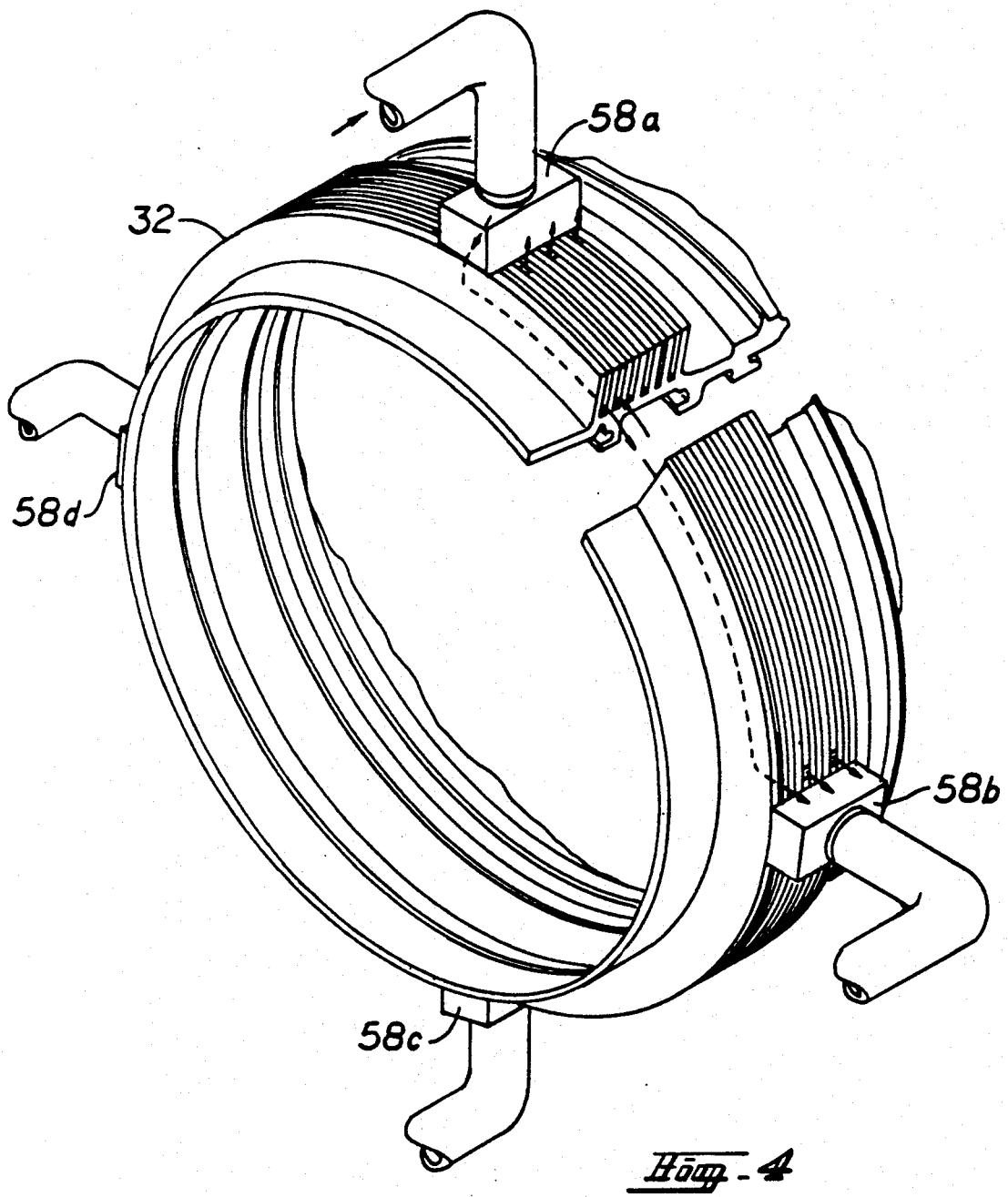

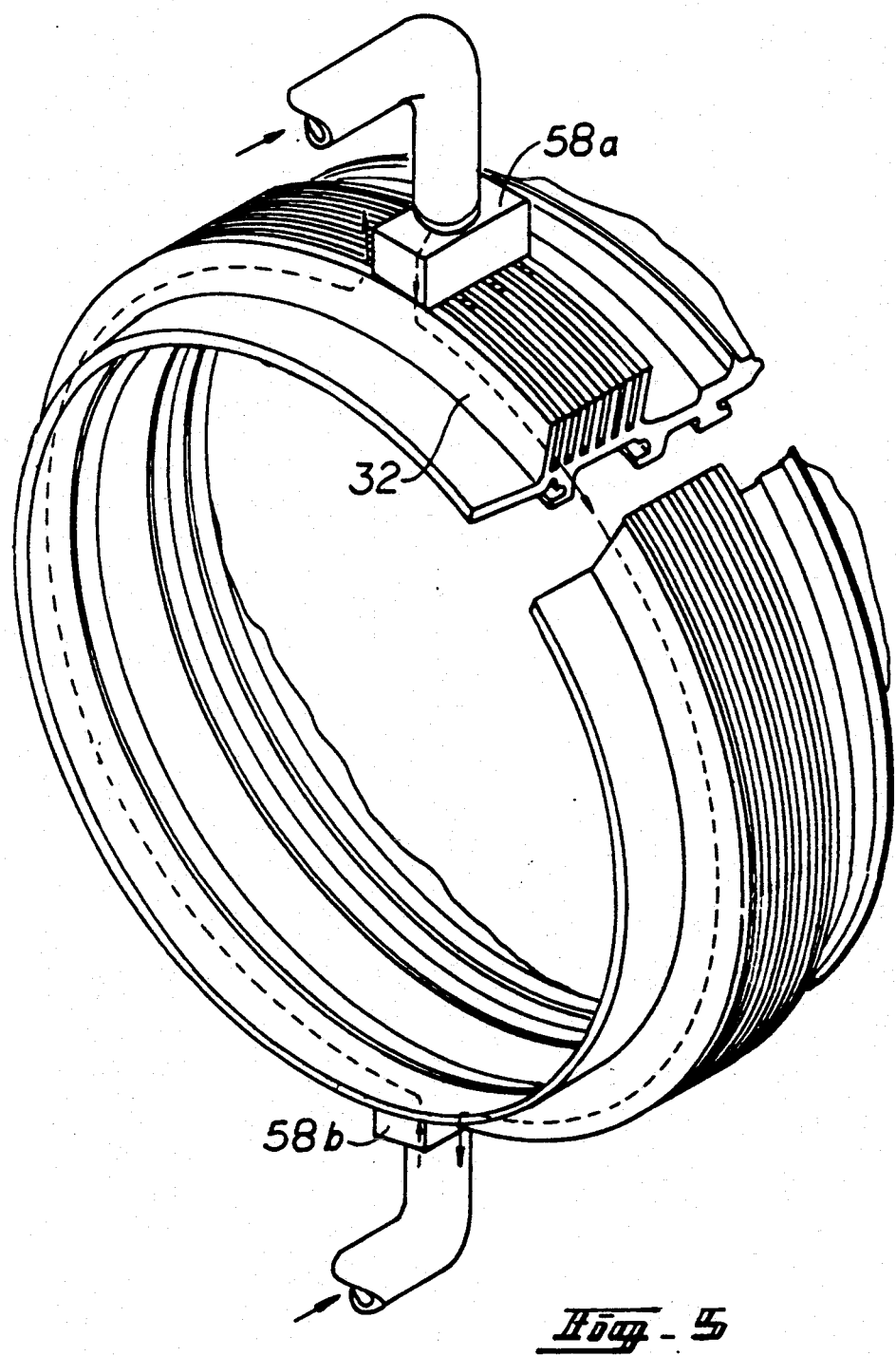

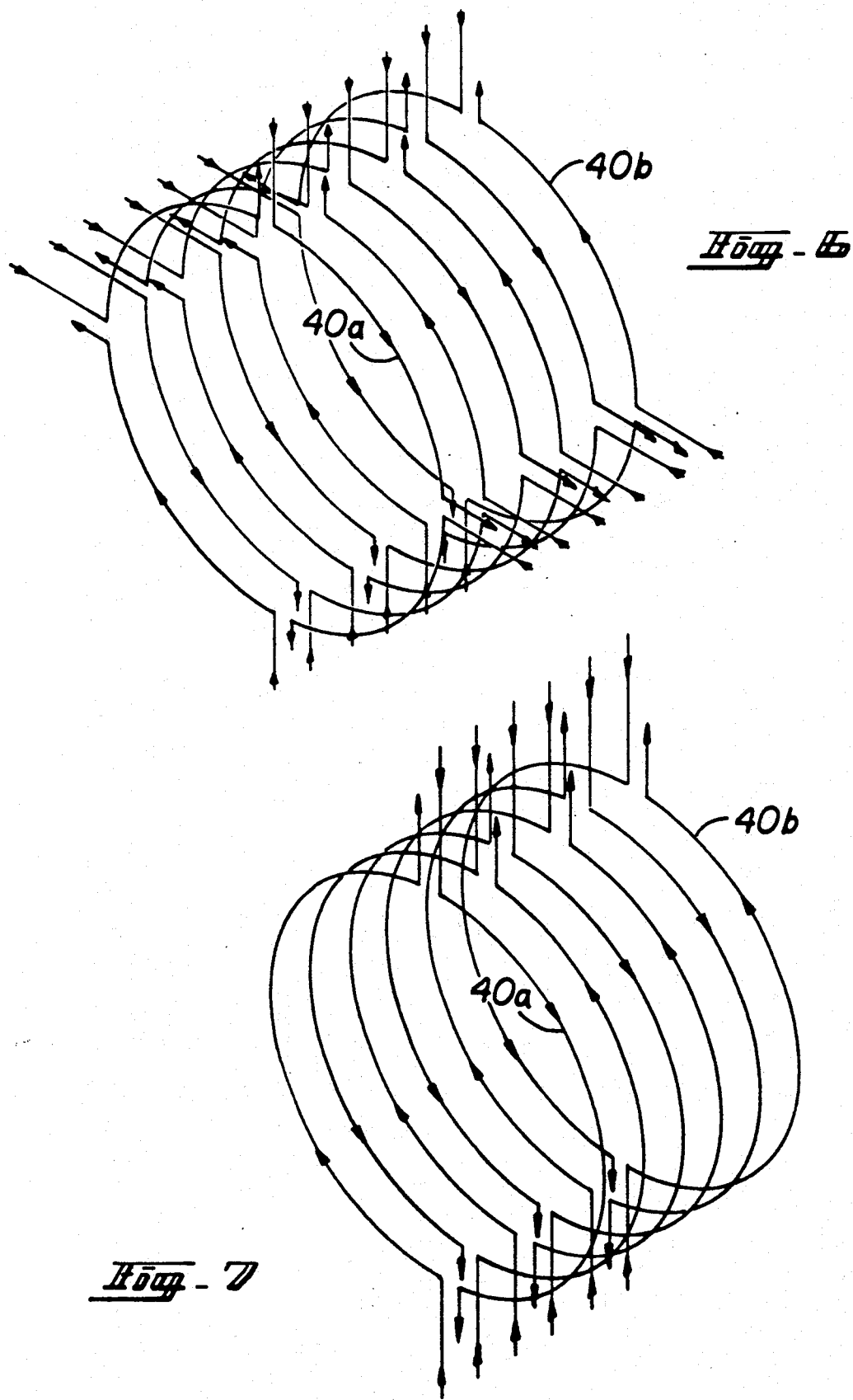

GAS TURBINE ENGINE CASE THERMAL CONTROL FLANGE

BACKGROUND OF THE INVENTION

1. Field of the Invention

The invention relates to thermal control of gas turbine engine cases and particularly for thermal control of clearances between turbine rotors employing thermal control rings having heat transferring thermal control fluid passages within and used to radially mount and thermally control positioning of shrouds.

2. Description of Related Art

Rotor clearance control systems that incorporate heating and cooling to effect thermal control of shrinkage and expansion of different parts of gas turbine engine cases are used for aircraft gas turbine engines to reduce leakage losses and improve specific fuel (SFC) consumption of the engines. One example of such an apparatus can be found described in U.S. Pat. No. 4,826,397, entitled "Stator Assembly for a Gas Turbine Engine", by Paul S. Shook and Daniel E. Kane. Reference may be had to this patent, by Shook et al, for background information and, for this reason, it is incorporated herein by reference. Shook discloses a clearance control system that uses spray tubes that spray air ducted from the engine's fan or compressor to cool turbine engine case rings in order to thermally control the clearance between an engine turbine rotor section and a corresponding stator section shroud disposed around the turbine rotor section. The Shook patent attempts to control circumferential thermal gradients around the rings, or rails as they are referred to in the patent, by shielding and insulating the rails. The shielding does not eliminate the circumferential gradient but does reduce the magnitude and severity of the gradient and therefore the stress and clearance variation that such a severe circumferential thermal gradient causes.

However spray tubes behave as heat exchangers and a circumferential variation in the temperature of the heat transfer fluid cannot be avoided nor the attendant problems associated with such a circumferential variation as shown in the prior art. The circumferential variation in the temperature of the air used to thermally control the rings produces unequal expansion and contraction of the rings particularly during transient operation of the engine such as during take-off.

The circumferential temperature variation produces a mechanical distortion of the engine casing or rings associated with the casing commonly referred to as an out of round condition. Such out of round conditions further leads to increased rubbing of the rotor and its corresponding stator assemblies such as between rotor blades and surrounding stator shrouds or between rotating and static seal assemblies. The out of round condition causes increased operating clearances, reduced engine performance, a deteriorating engine performance, and reduced component efficiency. Often difficult and expensive machining of circumferential variations in the static parts is employed during the manufacturing of the casing components to compensate for the operational circumferential variations in the thermal control air.

Another example of a clearance control system is found described in U.S. Pat. No. 4,363,599, entitled "Clearance Control", by Larry D. Cline et al assigned to General Electric the assignee of the present invention, that discloses the use of control rings integrated into the turbine casing and supporting a turbine shroud that surround and seals about turbine rotor blades. Thermal control air is supplied to the rings to effect thermally induced clearance control between the turbine blade tips and the surrounding shroud. Thermal control air is supplied to the rings from an area surrounding the combustor and through axial extending passages in the casing and through the rings.

A General Electric CF6-80C2 turbofan gas turbine engine incorporates a case flange assembly as depicted in FIGS. 8, 8a, and 8b, labelled as prior art, having a turbine shroud thermal control ring 220 bolted between a compressor case flange 210 and a turbine case flange 216. Compressor flange 210 and turbine flange 216 have compressor and turbine flange cooling air grooves 260a and 260b respectively facing thermal control ring 220. Cooling air is fed into compressor flange cooling air groove 260a through a radial inlet slot 270a which is cut through compressor flange 210 to groove 260a.

Compressor and turbine flanges have bolt holes 226 which snugly receive bolts 240. Control ring 220 has alternating bolt holes 226 and enlarged bolts holes 230 that provides a cooling air passage through control ring 220 to turbine flange cooling air groove 260b. Radial cooling air exhaust slots 270b provide an exit for the cooling air from the flange assembly.

There are 34 bolt holes around the engine flange assembly and 17 sets of radial slots providing cooling air passages for thermal control around the ring. Cooling air is fed to the grooves at different circumferential locations and thereby subject to circumferential variations in the cooling air temperature. Another disadvantage of the prior art is that a substantial amount of the thermal control air used is not effective because of the method used to spray the air on the thermally controlled ring or engine case section does not maximize the heat sink capacity of the thermal control air. One method to minimize temperature circumferential variations of thermal control air is disclosed in U.S. patent application No. 07/787,498, filed Nov. 4, 1991, entitled "GAS TURBINE ENGINE CASE COUNTERFLOW THERMAL CONTROL", by Larry W. Plemmons et al. (including the present inventor), and having the same assignee as the present application.

Plemmons discloses a means to thermally control a section of engine casing by counterflowing two heat transfer fluid flowpaths in heat transfer communication with the section of engine casing. The thermal control air from two adjoining counterflowing spray tubes is impinged on the engine casing such that there is substantially no circumferential gradient in the mass flowrate weighted average temperature of the heat transfer fluid being impinged. This method uses a great deal of air and flows much of the thermal control air away before all of its thermal energy can be used for control of the engine casing and thermal control ring.

SUMMARY OF THE INVENTION

The present invention provides a means to thermally control a section of engine casing by flowing heat transfer fluid within an axially disposed plurality of circumferentially extending flowpaths within a section of engine casing. The flowpaths are preferably arranged in alternating counterflowing directions such that there is substantially no circumferential gradient in the mass flowrate weighted average temperature of the heat transfer fluid supplied by any two adjacent counterflowing fluid flowpaths. Each circumferentially extending flowpath may have two or more circuits having inlets and outlets for flowing the heat transfer fluid.

The preferred embodiment is a thermal control ring or flange associated with an engine casing (rings may be attached to the casing by bolts, welding or some other fastening means or be integral with the casing) that supports a stator assembly that may be circumferentially segmented.

One embodiment of the present invention illustrated herein provides a means for counter-flowing thermal control air though sets of annular channels covered by an outer wall to form the flowpaths. The ring has three sets of circumferential circuits in each of two 180° sectors or four 90° sectors wherein the first, third and fifth flowpaths have thermal control air flowing in one circumferential direction and the second, fourth, and sixth flowpaths flow thermal control air in an opposite circumferential direction. Manifolds are used to supply the channels in a manner that counterflows the thermal control air.

ADVANTAGES

The present invention provides an inexpensive highly efficient method of effecting radial movement of annular casing elements by flowing thermal control fluid such as air. The present invention substantially eliminates circumferential temperature variation of gas turbine engine cases and associated rings, that are used to support stator assemblies, by using sets of two circumferentially counterflowing flowpaths internal to the rings. This provides a mass flowrate weighted average temperature of the heat transfer fluid in the ring at any point around the ring that is substantially the same.

Another advantage of the present invention is that is maximizes the use of the thermal energy mass of the thermal control fluid. This in turn minimizes the use of costly air bled from the fan and compressor sections of the engine and provides a potential improvement in specific fuel consumption (SFC) and a reduction in the size and weight of the pipes and valves required to flow the thermal control air.

This advantage substantially reduces or eliminates out of round conditions and circumferential stresses found in thermally controlled cases having variations in their heat transfer fluid on the order of as little as 50°-100° F. around the case.

The present invention reduces operating clearances by minimizing rubbing between rotor blade tips and corresponding stator assemblies thereby; improving engine performance, reducing the rate of engine performance deterioration, and improving component efficiency.

The present invention provides a further advantage by allowing gas turbine engines to be designed with tighter blade tip operating clearances thereby improving the engine's design fuel efficiency.

BRIEF DESCRIPTION OF THE DRAWINGS

The foregoing aspects and other features of the invention are explained in the following description, taken in connection with the accompanying drawings where:

FIG. 3 is a partial cutaway exploded perspective view, forward looking aft, of the manifolds and thermal control air passages in the thermal control ring of the clearance control system for the engine and stator assembly shown in FIGS. 1 and 2.

FIG. 4 is a partial perspective view of the manifolds and thermal control air passages of the clearance control system shown in FIG. 3.

FIG. 5 is a partial perspective view of the manifolds and thermal control air passages of an alternate embodiment of the clearance control system shown in FIG. 3.

FIG. 6 is a diagrammatic perspective view of airflow circuits of the embodiment of the clearance control system shown in FIG. 4.

FIG. 7 is a diagrammatic perspective view of airflow circuits of the embodiment of the clearance control system shown in FIG. 5.

DETAILED DESCRIPTION OF THE INVENTION

Figure 1:
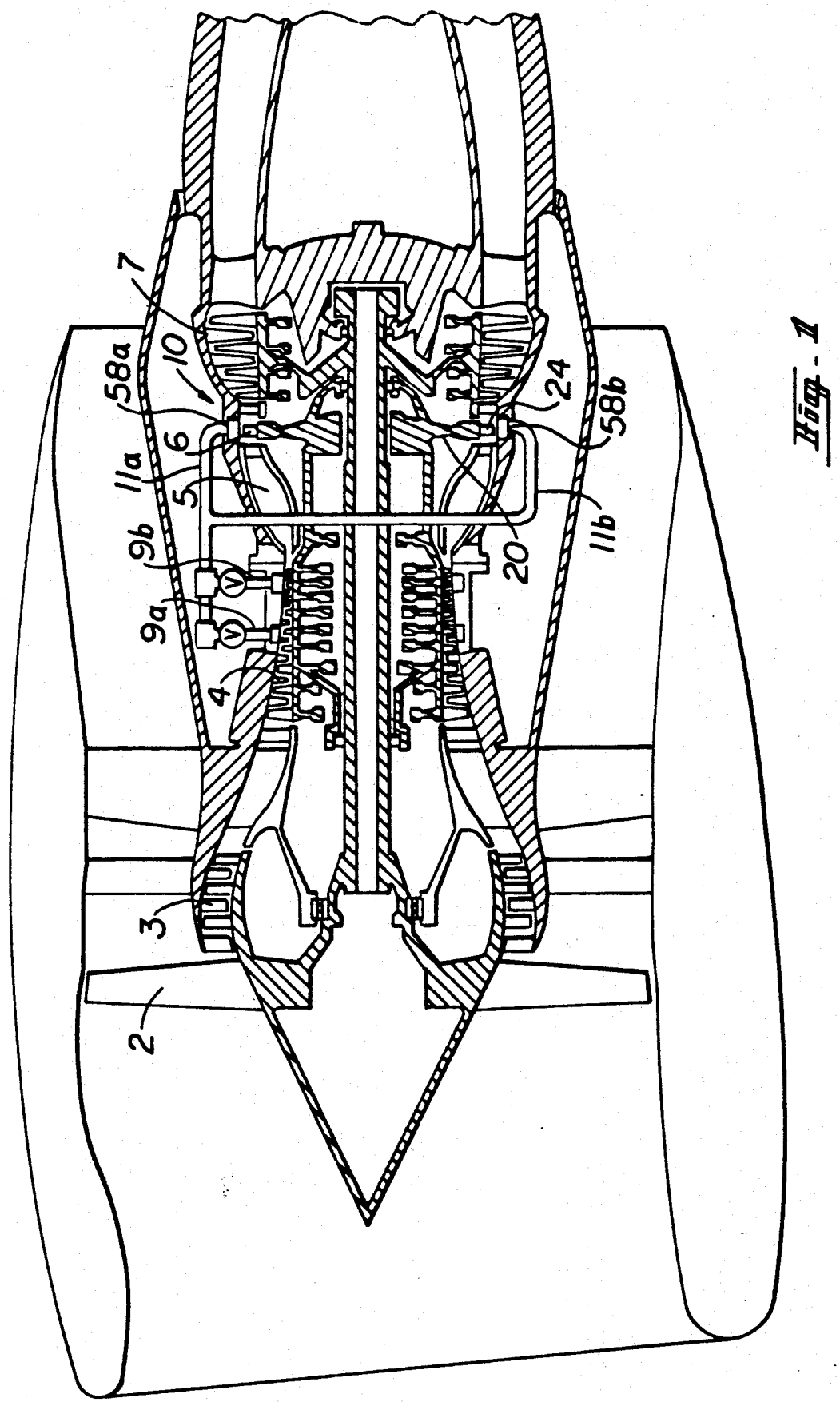
FIG. 1 is a diagrammatic view of an aircraft high bypass turbofan gas turbine engine having a turbine rotor clearance control system in accordance with the present invention.

FIG. 1 illustrates a typical gas turbine engine 1 such as a CFM56 series engine having in serial flow relationship a fan 2, a booster or low pressure compressor (LPC) 3, a high pressure compressor (HPC) 4, a combustion section 5, a high pressure turbine (HPT) 6, and a low pressure turbine (LPT) 7. A high pressure shaft drivingly connects HPT 6 to HPC 4 and a low pressure shaft 8 drivingly connects LPT 7 to LPC 3 and fan 2. HPT 6 includes an HPT rotor 20 having turbine blades 24 mounted at a periphery of rotor 20. A mid-stage air supply 9a and a high stage air supply 9b (typically drawing air from 4th and 9th stages respectively of HPC 4 in a CFM56 engine) are used as sources for thermal control airflow which is supplied to a turbine blade clearance control apparatus generally shown at 10 through upper and lower thermal control air supply tubes 11a and 11b respectively. The turbine blade clearance control apparatus 10, including counterflowing upper manifold 58a and lower manifold 58b, illustrates one form of the preferred embodiment of the present invention. The turbine blade clearance control apparatus 10 include, a thermal control ring having counterflowing thermal control fluid, such as either heating or cooling air. The turbine blade clearance control apparatus 10 of the present invention and is illustrated in greater detail in FIGS. 2 and 3.

Figure 2:
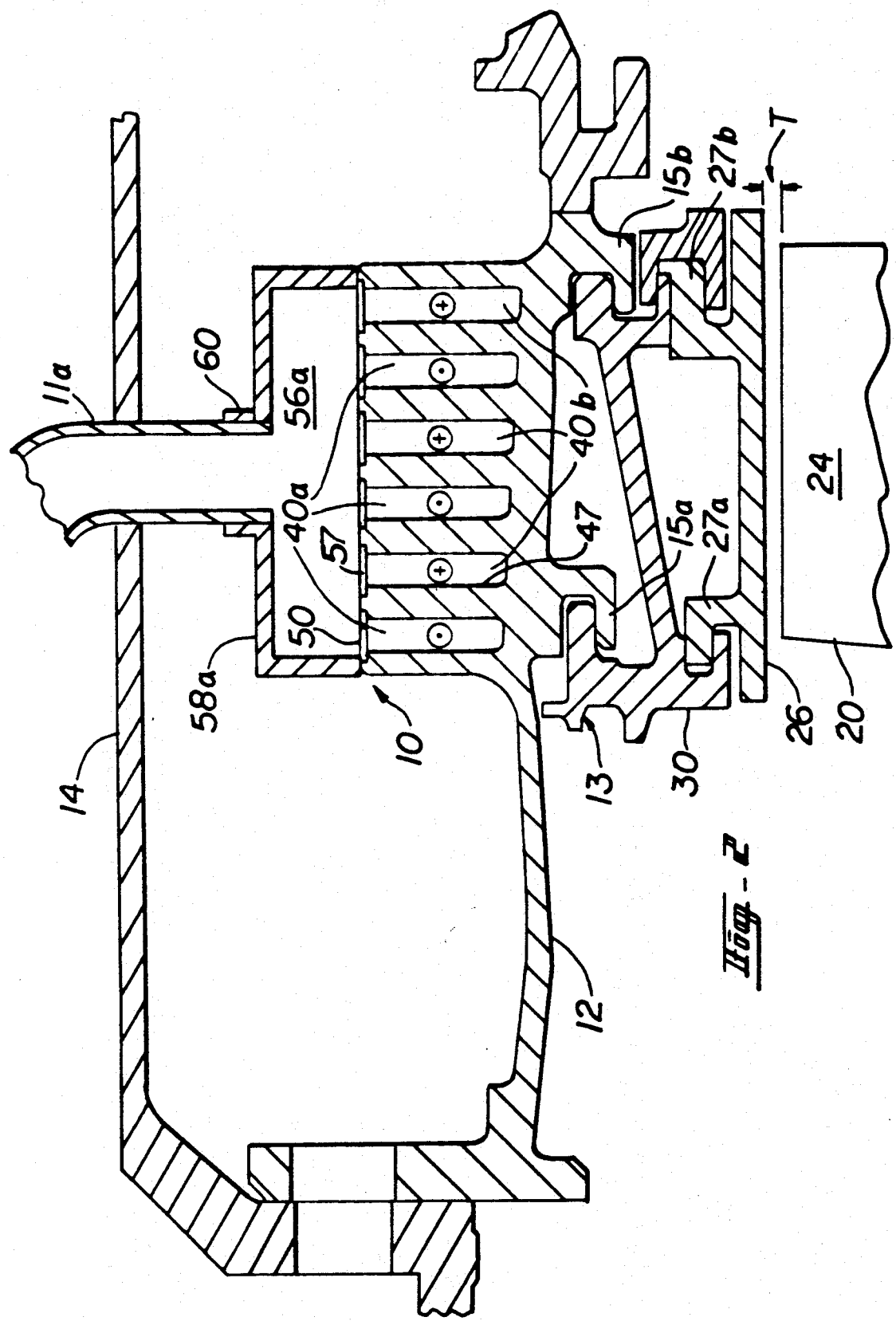
FIG. 2 is a cross-sectional view of a counterflowing thermal clearance control system for a stator assembly in the turbine section of the gas turbine engine in FIG. 1.
Figure 8:
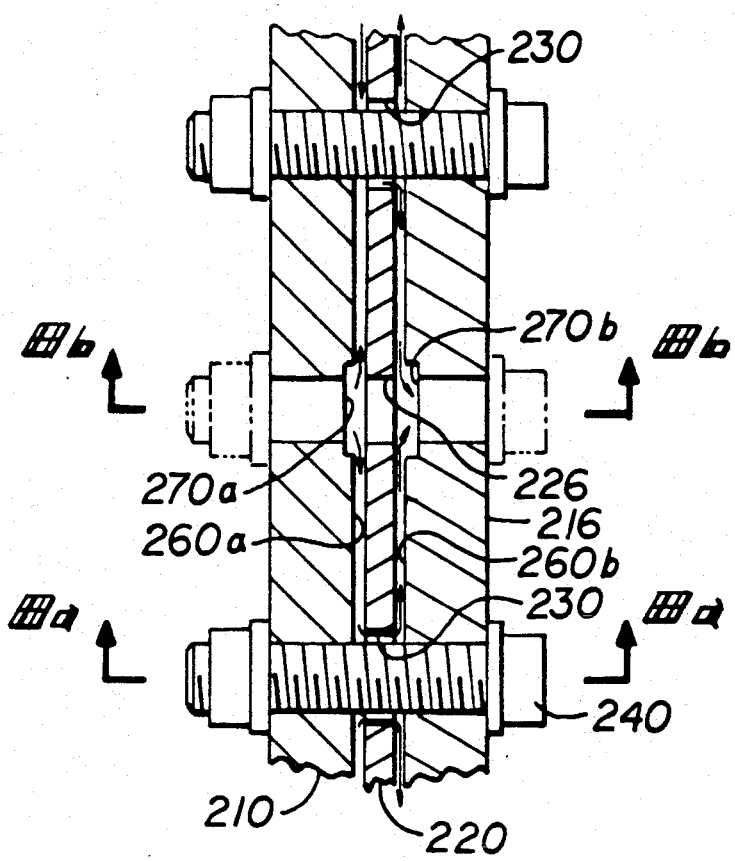
FIG. 8 is a top planform view of a prior art flange assembly for a thermal control system.
Figure 8A:
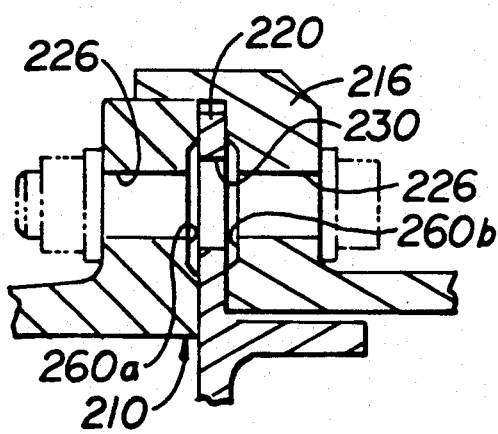
FIG. 8a is a side cutaway view of the prior art flange assembly taken through section AA in FIG. 8.
Figure 8B:
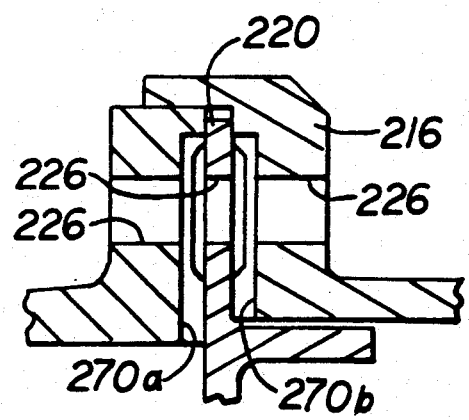
FIG. 8b is a side cutaway view of the prior art flange assembly taken through section BB in FIG. 8.

Referring now to FIG. 2, turbine blade clearance control apparatus 10 is illustrated using upper manifold 58a radially disposed between an annular inner casing 12 and an outer casing 14. A stator assembly generally shown at 13 is attached to inner casing 12 by forward and aft case hook means 15a and 15b respectively. Stator assembly 13 includes an annular stator shroud 26, preferably segmented, mounted by shroud hook means 27a and 27b to a preferably segmented shroud support 30. Shroud 26 circumscribes turbine blades 24 of rotor 20 and is used to prevent the flow from leaking around the radial outer tip of blade 24 by minimizing the radial blade tip clearance T.

It is well known in the industry that small turbine blade tip clearances provide lower operational specific fuel consumption (SFC) and thus large fuel savings. In order to more effectively control clearance T with a minimal amount of time lag and thermal control (cooling or heating depending on operating conditions) an airflow thermal control ring 32 is provided. Thermal control ring 32 is associated with inner casing 12 and may be integral with the respective casing (as illustrated in FIG. 2), may be bolted to or otherwise fastened to the casing, or may be mechanically isolated from but in sealing engagement with the casing. In each embodiment, the control ring provides thermal control mass to more effectively move shroud 26 radially inward and outward to adjust clearance T.

The embodiment illustrated in FIG. 2 uses thermal control air from stages of HPC 4 in FIG. 1 to cool or heat ring 32. The present invention supplies thermal control air through sets (three sets shown in FIG. 2) of counterflowing clockwise flowing thermal control air passages 40a and counter-clockwise flowing thermal control air passages 40b to cool each axially extending annular section of casing that for the embodiment in FIG. 2 is illustrated by thermal control ring 32. A heat transfer fluid flowpath in a first circumferential direction is indicated by ⊕ and its corresponding counterflowing flowpath is indicated by ○ in FIG. 2. The flowpaths 50 are constructed from grooves 47 formed in ring 32 and covered by sealing strips 57. The flowpaths 50 have inlets 49 where the sealing strip is not disposed over a portion of the groove 47 within its respective manifold and outlets 55 illustrated in FIGS. 3 and 4. A manifold inlet 60 is adapted to receive heat transfer fluid from a respective control air supply tube 11a, shown in FIG. 1.

Referring now to FIG. 3, a perspective diagrammatic view is shown of upper manifold 58a mounted on thermal control ring 32. Inlets 49a allow thermal control airflow from thermal control air supply tube 11a into first, third, and fifth clockwise flowing thermal control air passages 40a while outlets 65b disposed clockwise of upper manifold 58a provides an outlet for second, fourth, and sixth counterflowing counter-clockwise flowing thermal control air passages 40b. In the configuration shown in FIG. 3 thermal control air is introduced at 4 angular positions about casing 12 and makes a 90 degree passage to its respective outlet (see FIG. 4). Flow blockers 71 in the airflow passages are used to help define the flow path ends and conduct the thermal control air in its appropriate circumferential direction.

Briefly referring to FIG. 4 bottom manifold 58b, right hand manifold 58c, and left hand manifold 58d are shown constructed in a similar manner to top manifold 58a in FIG. 2 and provides 90 degree circuits for the thermal control air to travel within thermal control ring 32 as indicated by the arrows and line path. Alternatively, a top manifold 58a and a bottom manifold 58b may be used to provide 180 degree circuits as shown in FIG. 5. The 90 degree circuit shown in FIG. 4 is diagrammatically illustrated in FIG. 6 and the 180 degree circuit shown in FIG. 5 is diagrammatically shown in FIG. 7, to schematically illustrate the counterflowing nature of the clockwise flowing thermal control air passages 40a and the counter-clockwise flowing thermal control air passages 40b.

While the preferred embodiment of the present invention has been described fully in order to explain its principles, it is understood that various modifications or alterations may be made to the preferred embodiment without departing from the scope of the invention as set forth in the appended claims.

I claim:

1. A thermal control apparatus for a gas turbine engine casing, said thermal control apparatus comprising: a plurality of axially spaced apart circumferentially disposed heat transfer flowpaths for flowing a heat transfer fluid within an axially extending section of the casing wherein a first set of said heat transfer flowpaths flows said heat transfer fluid in a first direction and a second set of said heat transfer flowpaths flows said heat transfer fluid in a second direction opposite to said first direction and wherein said first set of heat transfer flowpaths are interlaced with said second set of heat transfer flowpaths.

2. A thermal control apparatus as claimed in claim 1 wherein said axially extending section of the casing is a thermal control ring.

3. A thermal control apparatus as claimed in claim 2 further comprising a support means tying an annular stator assembly to said thermal control ring such that expansion and contraction of said thermal control ring will cause a corresponding expansion and contraction of said stator assembly.

4. A thermal control apparatus as claimed in claim 3 wherein said stator assembly comprises a segmented annular stator shroud.

5. A thermal control apparatus as claimed in claim 1 wherein said axially extending section of the casing is a thermal control ring.

6. A thermal control apparatus as claimed in claim 5 further comprising a support means tying an annular stator assembly to said thermal control ring such that expansion and contraction of said thermal control ring will cause a corresponding expansion and contraction of said stator assembly.

7. A thermal control apparatus as claimed in claim 6 wherein said stator assembly comprises a segmented annular stator shroud.

8. A thermal control apparatus as claimed in claim 1 wherein each of said counterflowing heat transfer flowpaths comprise at least two circuits, said circuits having an inlet and an outlet.

9. A thermal control apparatus as claimed in claim 8 further comprising a support means tying an annular stator assembly to said thermal control ring such that expansion and contraction of said thermal control ring will cause a corresponding expansion and contraction of said stator assembly.

10. A thermal control apparatus as claimed in claim 9 wherein said stator assembly comprises a segmented annular stator shroud.

11. A thermal control apparatus as claimed in claim 10 wherein said circuits are 90 degree circuits wherein said inlets are located in thermal control fluid manifold and said outlets are 90 degrees apart from said inlets.

12. A thermal control apparatus as claimed in claim 11 wherein said circuits are 180 degree circuits wherein said inlets are located in thermal control fluid manifold and said outlets are 180 degrees apart from said inlets.

13. A thermal control apparatus for a gas turbine engine casing, said thermal control apparatus comprising:

a plurality of axially spaced apart circumferentially disposed heat transfer flowpaths for flowing a heat transfer fluid within an axially extending section of the casing wherein said axially extending section of the casing is a thermal control ring and wherein said plurality of axially spaced apart circumferentially disposed flowpaths comprising sets of alternating counter-flowing flowpaths such that any two adjacent flowpaths from a set flow of a clockwise and counter-clockwise flowing heat transfer flowpaths.

14. A thermal control apparatus as claimed in claim 13 wherein each of said counterflowing heat transfer flowpaths comprise at least two circuits, said circuits having an inlet and an outlet.

15. A thermal control apparatus as claimed in claim 14 further comprising a support means tying an annular stator assembly to said thermal control ring such that expansion and contraction of said thermal control ring will cause a corresponding expansion and contraction of said stator assembly.

16. A thermal control apparatus as claimed in claim 15 wherein said stator assembly comprises a segmented annular stator shroud.

17. A thermal control apparatus as claimed in claim 16 wherein said circuits are 90 degree circuits wherein said inlets are located in thermal control fluid manifold and said outlets are 90 degrees apart from said inlets.

18. A thermal control apparatus as claimed in claim 16 wherein said circuits are 180 degree circuits wherein said inlets are located in thermal control fluid manifold and said outlets are 180 degrees apart from said inlets.

* * * * *